United States Patent
Tai (10) Patent No.: US 7,798,169 B2
(45) Date of Patent: Sep. 21, 2010

(54) ONE-PIECE GAS PRESSURE REGULATOR

(76) Inventor: Su-Hua Tai, No. 100, Tzu Chiang W. Road, Kweishan Hsiang, Taoyuan County 333 (TW)

( * ) Notice: Subject to any disclaimer, the term of this patent is extended or adjusted under 35 U.S.C. 154(b) by 364 days.

(21) Appl. No.: 11/987,146

(22) Filed: Nov. 28, 2007

(65) Prior Publication Data

US 2009/0133760 A1    May 28, 2009

(51) Int. Cl.
    *G05D 16/10* (2006.01)
(52) U.S. Cl. .................. 137/505.28; 137/557; 137/613
(58) Field of Classification Search ................ 137/505, 137/505.28, 557, 613
    See application file for complete search history.

(56) References Cited

U.S. PATENT DOCUMENTS

| 2,666,278 | A | * | 1/1954 | Matasovic | ............... | 137/454.5 |
| 3,250,292 | A | * | 5/1966 | Mollick | ................. | 137/505.28 |
| 5,135,023 | A | * | 8/1992 | Ross | ...................... | 137/505.11 |
| 5,704,589 | A | * | 1/1998 | Canuteson | .................. | 137/557 |
| 2002/0083980 | A1* | | 7/2002 | Nakajima et al. | ...... | 137/505.41 |

* cited by examiner

Primary Examiner—Stephen Hepperle
(74) Attorney, Agent, or Firm—Rosenberg, Klein & Lee (57) ABSTRACT

A one-piece gas pressure regulator, comprising a main body having a first threaded port at the bottom thereof for a threaded connection with a high-pressure gas bottle. An admission passage is formed above the first threaded port and extended to a hollow pressure chamber within the main body. The hollow pressure chamber has an escape channel for ejecting the gas via an output control element, wherein the main body includes a second threaded port having a greater diameter and is positioned above the hollow pressure chamber. The second threaded port is adapted to receive a cylindrical body. The inside of the cylindrical body is divided by a partition into an upper and a lower chamber. The partition has a through hole in the middle thereof. The upper chamber is adapted to receive a pressure detector while the lower chamber is used to receive a pressure-adjusting element. The through hole is formed in such a way that a connecting head of a pressure detector is extended into the through hole. In this way, the main body and the cylindrical body are integrated into a body, and the upper portion of the cylindrical body and the pressure detector are formed in a one-piece pressure gauge while the lower portion thereof serves as an automatic gas-pressure balancing/regulating chamber for the lifting action of the pressure-adjusting element. As a result, the gas pressure regulator in accordance with the invention achieves an overall sense. Meanwhile, the pressure gauge can be protected from skewing impacts that cause damage.

3 Claims, 8 Drawing Sheets

ONE-PIECE GAS PRESSURE REGULATOR

BACKGROUND OF THE INVENTION

1. Field of the Invention

The invention relates to a one-piece gas pressure regulator, and more particularly to a one-piece gas pressure regulator that prevents the pressure gauge from impact and damage as well as enhances the precision of pressure adjustment. Moreover, an integrated structure is ensured and less space is occupied. The gas pressure regulator in accordance with the invention is particularly applicable to the adjustment of $CO_2$ pressure in the field of water plants breeding, but the application should not limited thereto.

2. Description of the Related Art

Some high-pressure gas, such as carbon dioxide ($CO_2$), oxygen, acetylene, nitrogen, argon, etc., must be bottled for industrial use. Prior to use of the bottled high-pressure gas, a gas pressure regulator is required for adjusting the gas pressure to a proper level such that a normal use and safety of the equipment pipeline, tools or related equipment are guaranteed. Whether the secondary pressure output is stable or not, is the primary function of the gas pressure regulator.

Figure 1:
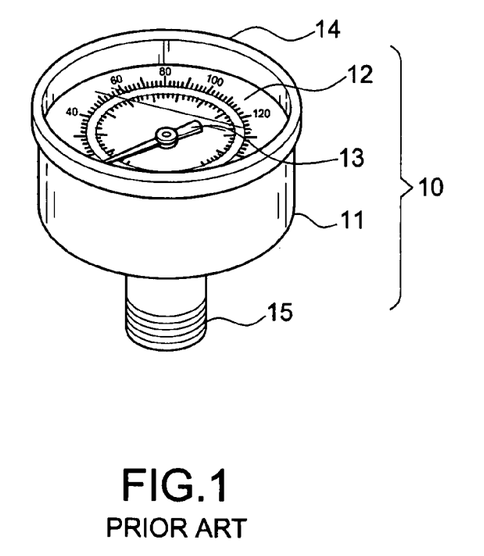
FIG. 1 is a perspective view of a conventional pressure gauge.
Figure 2:
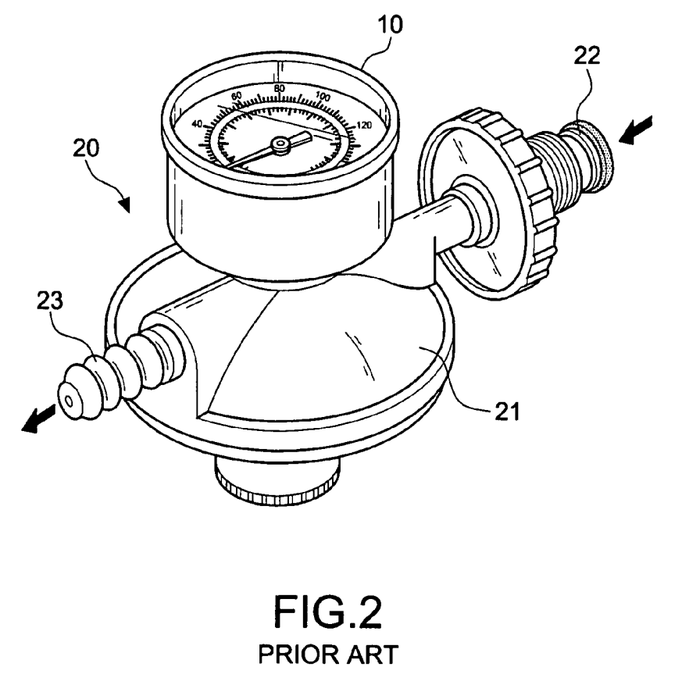
FIG. 2 is a perspective view of a conventional gas pressure regulator.
Figure 3:
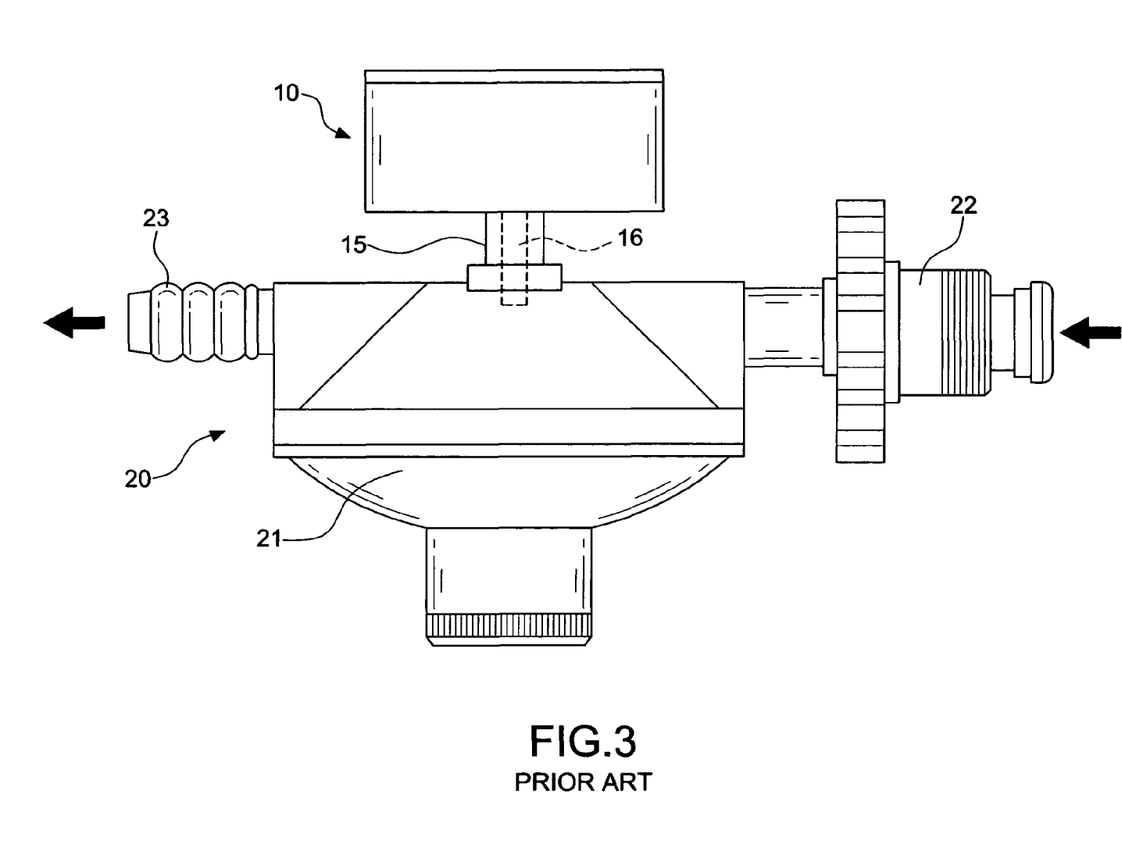
FIG. 3 is a side view of the conventional gas pressure regulator.

First of all, the gas pressure regulator must have a pressure gauge. As shown in FIG. 1, a conventional pressure gauge 10 includes a housing 11, an instrument panel 12, a pointer 13, a transparent cap 14, and a threaded tube 15 formed at the bottom thereof. As shown in FIGS. 2 and 3, the pressure gauge 10 employs the threaded tube 15 screwed to a main body 21 of a gas pressure regulator 20. The threaded tube 15 internally includes a coupling head 16 having the function of detecting the gas pressure within the gas pressure regulator 20. Both sides of the 21 communicate with an admission port 22 and an escape port 23, respectively.

The conventional gas pressure regulator 20 is fixed on the pressure gauge 10 at the top of the main body 21 by means that the threaded tube 15 is screwed to the main body 21 after the housing 11 encloses the detecting elements. Generally, the gas pressure regulator 20 is installed on the high-pressure gas bottles so that it is easily subject to impact force, thereby causing destruction thereof. Especially, the stress is easily concentrated at the threaded tube 15. Moreover, the coupling head 16 of the pressure gauge 10 is very sensitive and easily skewed and deformed when subject to the external force, thereby lowering the accuracy. Thus, an accurate output of the gas pressure is not achieved and a normal operation of the instruments and tools is affected. In addition, the safety is not ensured.

Moreover, the structure of the conventional gas pressure regulator 20 is unfavorable for miniaturization, particularly unfavorable for the disposable mini-type high-pressure gas bottle having the height of 10-15 cm and the diameter of 8 cm. This kind of gas bottles is used for supplying $CO_2$ in the field of water plants breeding. Thus, the application scope is much limited.

In addition, the conventional gas pressure regulator 20 is not easily combined with a solenoid valve 80 (not shown) for a 24-hour automatic control of the gas output. This requires further improvements.

SUMMARY OF THE INVENTION

It is a primary object of the invention to provide a one-piece gas pressure regulator that prevents the pressure gauge from impact and damage, enhances the pressure adjustment precision as well as prolongs the service life.

It is another object of the invention to provide a one-piece gas pressure regulator whose volume can be minimized and which occupies less space. Particularly, it is application to a mini-type high-pressure gas bottle. Moreover, a solenoid valve can be conveniently fitted to the side of the main body for an automatic control of the gas output.

It is a further object of the invention to provide a one-piece gas pressure regulator that ensures an easy assembly and an integral appearance, thereby enhancing the product value.

In order to achieve the above-mentioned objects, a one-piece gas pressure regulator in accordance with the invention includes:

a) a main body having a first threaded port at the bottom thereof for a threaded connection with a high pressure gas bottle, an admission passage being formed above the first threaded port and extended to an hollow pressure chamber within the main body, the hollow pressure chamber having an escape channel for ejecting the gas via an output control element, wherein the main body includes a second threaded port having a greater diameter and is positioned above the hollow pressure chamber; and b) a cylindrical body having an opening at the top and at the bottom thereof, the periphery of the lower member thereof being provided with thread for establishing a threaded connection to the second threaded port, the inside of the cylindrical body being divided by a partition into an upper and a lower chamber, the partition having a through hole in the middle thereof, the upper chamber being adapted to receive a pressure detector while the lower chamber is used to received a pressure adjusting element, the through hole being formed in such a way that a connecting head of a pressure detector is extended into the through hole;

whereby the main body and the cylindrical body are integrated into a body, and the upper portion of the cylindrical body and the pressure detector are formed in a one-piece pressure gauge while the lower portion thereof serves as an automatic gas-pressure balancing/regulating chamber for the lifting action of the pressure-adjusting element.

BRIEF DESCRIPTION OF THE FIGURES

The accomplishment of this and other objects of the invention will become apparent from the following descriptions and its accompanying figures of which.

DETAILED DESCRIPTION OF THE PREFERRED EMBODIMENT

Figure 4:
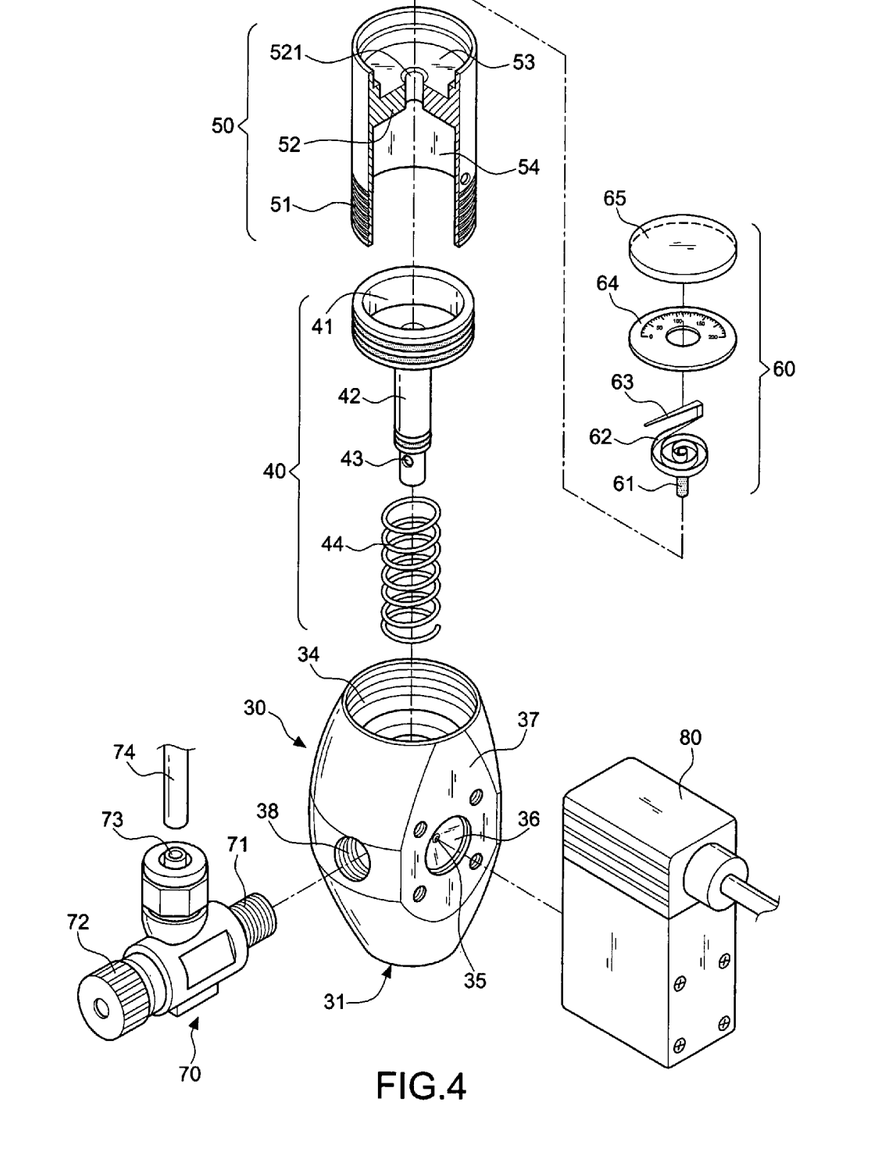
FIG. 4 is an exploded perspective view of a preferred embodiment of the invention.
Figure 5:
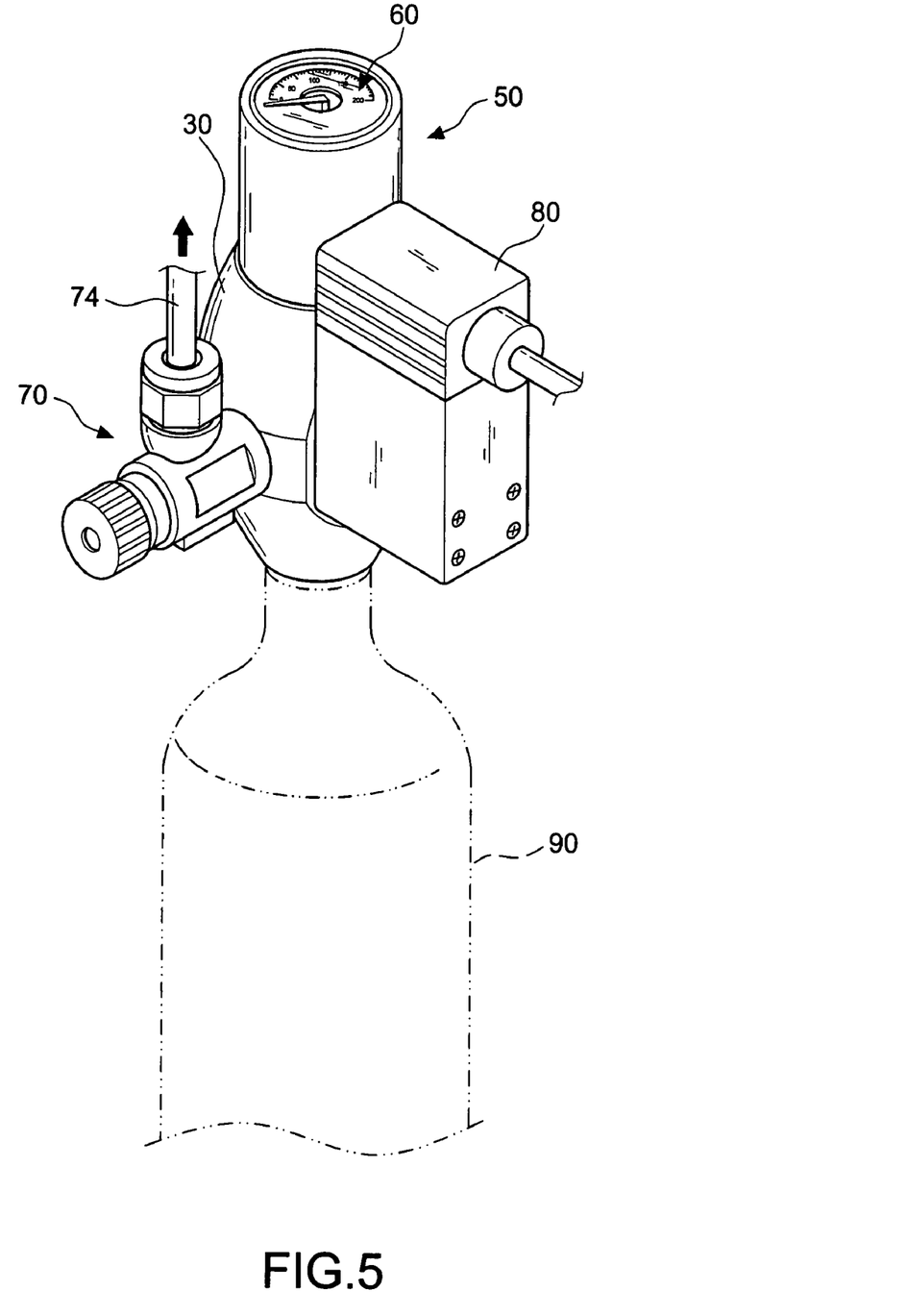
FIG. 5 is a perspective assembly view of the preferred embodiment of the invention.
Figure 6:
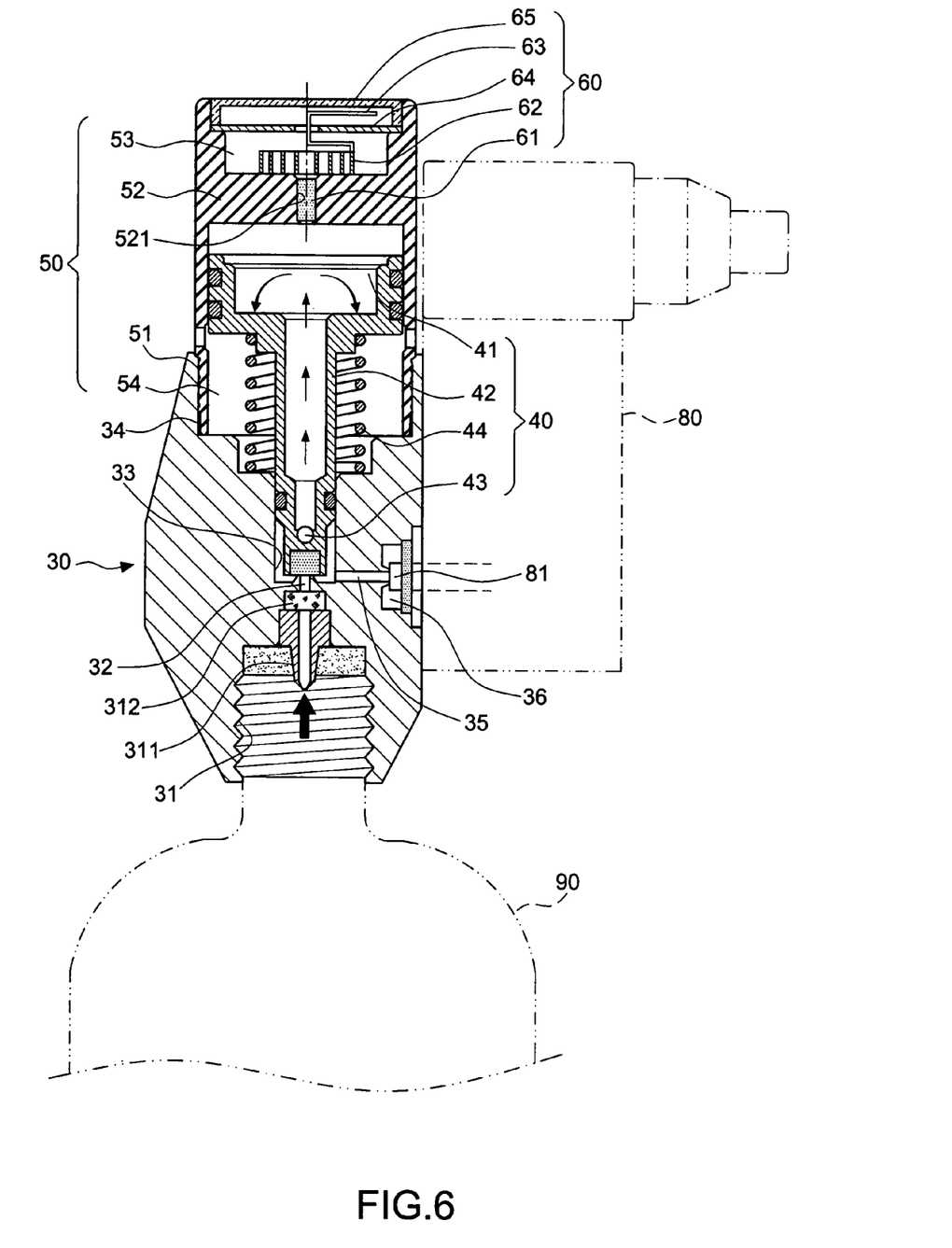
FIG. 6 is a cutaway view of the preferred embodiment of the invention, showing the escape gas is blocked.

First of all, referring to FIGS. 3 and 4, a preferred embodiment of the invention includes a main body 30 with a first threaded port 31 at the bottom thereof for a threaded connection with a high-pressure gas bottle 90. As shown in FIG. 6 illustrating a cutaway view of the invention, an admission passage 32 is formed above the first threaded port 31 and extended to a hollow pressure chamber 33 within the main body 30. A forcing pin 311 and a filter gauze 312 are interposed between the first threaded port 31 and the admission passage 32. The forcing pin 311 is adapted to pierce a protective layer in screwing the high-pressure gas bottle 90 thereinto. The filter gauze 312 is used for filtering purpose. These two elements belongs to the prior art so that no further descriptions thereto are given hereinafter.

The above-mentioned hollow pressure chamber 33 includes an escape channel 35 for ejecting the gas via an output control element 70.

The invention is characterized in that the main body 30 includes a second threaded port 34 having a greater diameter and is positioned above the hollow pressure chamber 33. A cylindrical body 50 has an opening at the top and at the bottom thereof, respectively. The periphery of the lower member thereof is provided with thread 51 for establishing a threaded connection to the second threaded port 34. The inside of the cylindrical body 50 is divided by a partition 52 into an upper and a lower chamber 53, 54. It is preferable that the partition 52 and the cylindrical body 50 are integrally formed. The partition 52 includes a through hole 521 in the middle thereof. The upper chamber 53 is adapted to receive a pressure detector 60 while the lower chamber 54 is used to receive a pressure-adjusting element 40.

The pressure detector 60 includes a connecting head 61 extending into the through hole 521 in position such that the connecting head 61 can detect the pressure within the lower chamber 54 for extending or retracting a coiled telescopic tube 62 attached to the connecting head 61 according to the intensity of pressure, thereby turning a pointer 63 disposed at the tail of the coiled telescopic tube 62. The pointer 63 is ⊃-shaped and protrudes on an instrument panel 64. Meanwhile, the opening of the upper chamber 53 is covered with a transparent cap 65. Moreover, the pressure detector 60 according to the invention is integrated into the upper chamber 53 of the cylindrical body 50, thereby integrally forming a pressure gauge. In this way, the connecting head 61 is positioned within the through hole 521 of the partition 52. Thus, the possibility to be subject to the external impact is minimized such that the service life and the accuracy are ensured.

Figure 7:
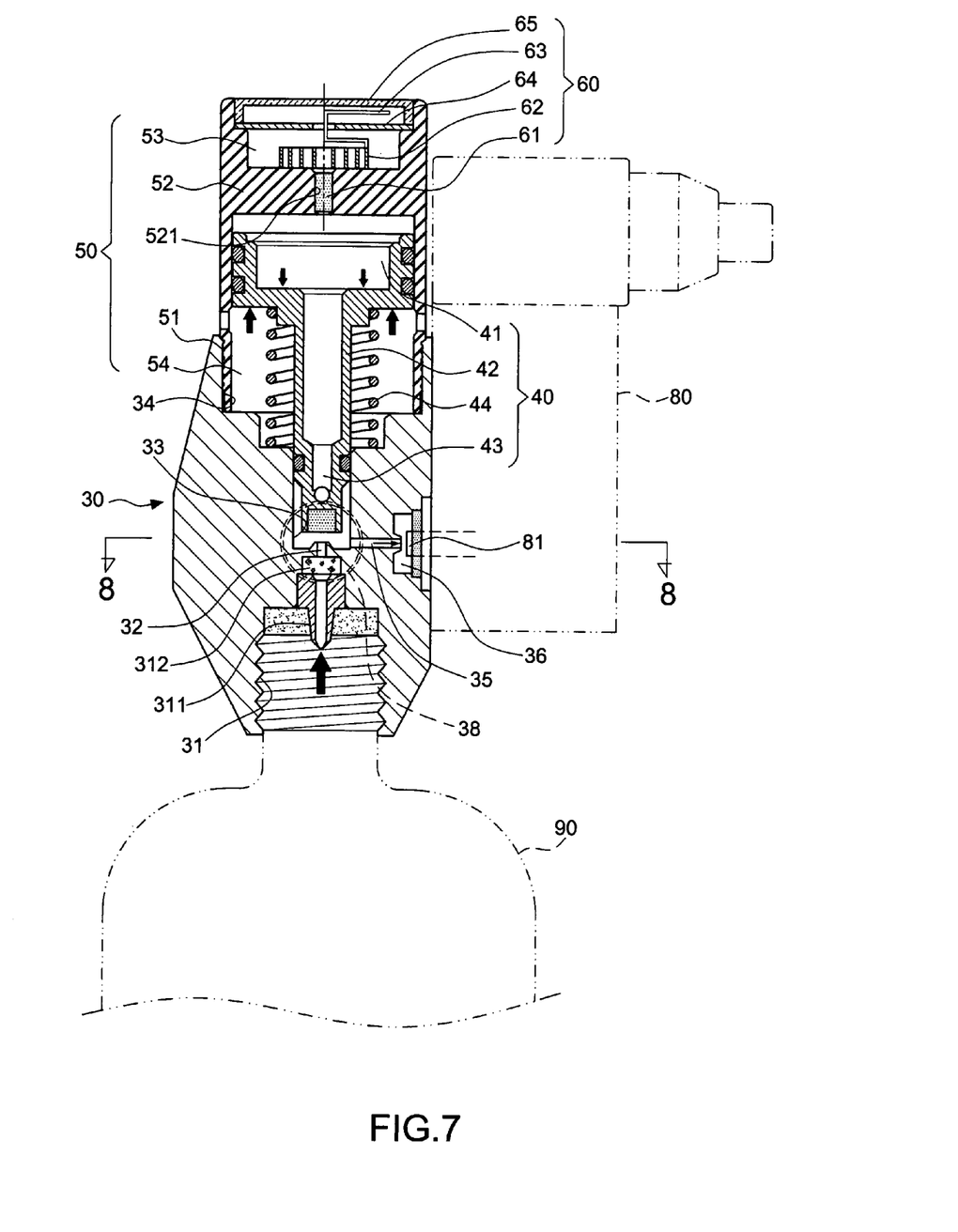
FIG. 7 is a cutaway view of the preferred embodiment of the invention, showing the escape gas is released.

The pressure-adjusting element 40 in the lower chamber 54 of the cylindrical body 50 includes a piston 41. A tube 42 is attached to the bottom of the piston 41. A through hole 43 is formed at the side of the tube 42. A spring 44 is mounted on the tube 42. The effect of the above-mentioned pressure adjusting element 40 is that the gas ejected from the admission passage 32 of the main body 30 and injected into the hollow pressure chamber 33 flows via the through hole 43 to the top of the piston 41. The interaction of the air pressure above the piston 41 and the resilience of the spring 44 under the piston 41 constantly create the change and the equilibrium of the acting force. As shown in FIGS. 6 and 7, the piston 41 is moved upward and downward for an automatic adjustment of the gas pressure. The principle and the structure of the pressure adjusting element 40 have been disclosed in the prior art. However, most of the conventional pressure adjusting elements 40 are positioned at the bottom of the main body (see FIGS. 2 and 3). According to the invention, the pressure detector 60 is positioned within the cylindrical body 50. In this way, a convenient assembly is ensured. Moreover, the entire gas pressure regulator obtains an integral appearance and occupies less space such that it is suitable for the mini-type high-pressure gas bottle 90.

Figure 8:
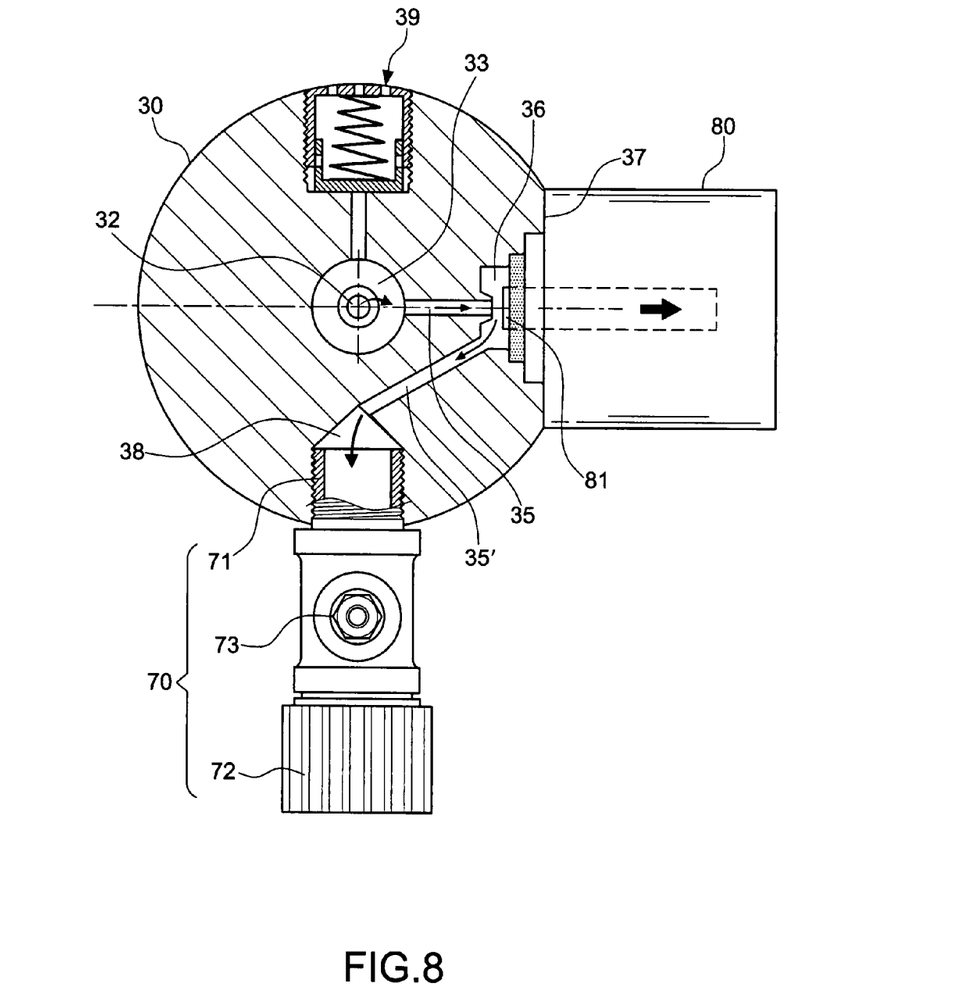
FIG. 8 is a cross-sectional view taken along the line 8-8 in FIG. 7.

As shown in FIGS. 4 and 6, the output control element 70 is installed at a terminal gas outlet 38 of the escape channel 35. In other words, the pressure of the gas is reduced first whereupon the gas is ejected through the terminal gas outlet 38. The output control element 70 includes a threaded head 71 for establishing a threaded connection to the terminal gas outlet 38. The output control element 70 has an adjusting knob 72 at the rear end thereof for controlling the output amount and the on/off position. Meanwhile, the output control element 70 includes a coupling head 73 for connecting a gas-feeding hose 74. As shown in FIG. 8, the main body 30 includes a safety valve 39. The output control element 70 and the safety valve 39 belong to the prior art so that no further descriptions thereto are given hereinafter.

Figure 9:
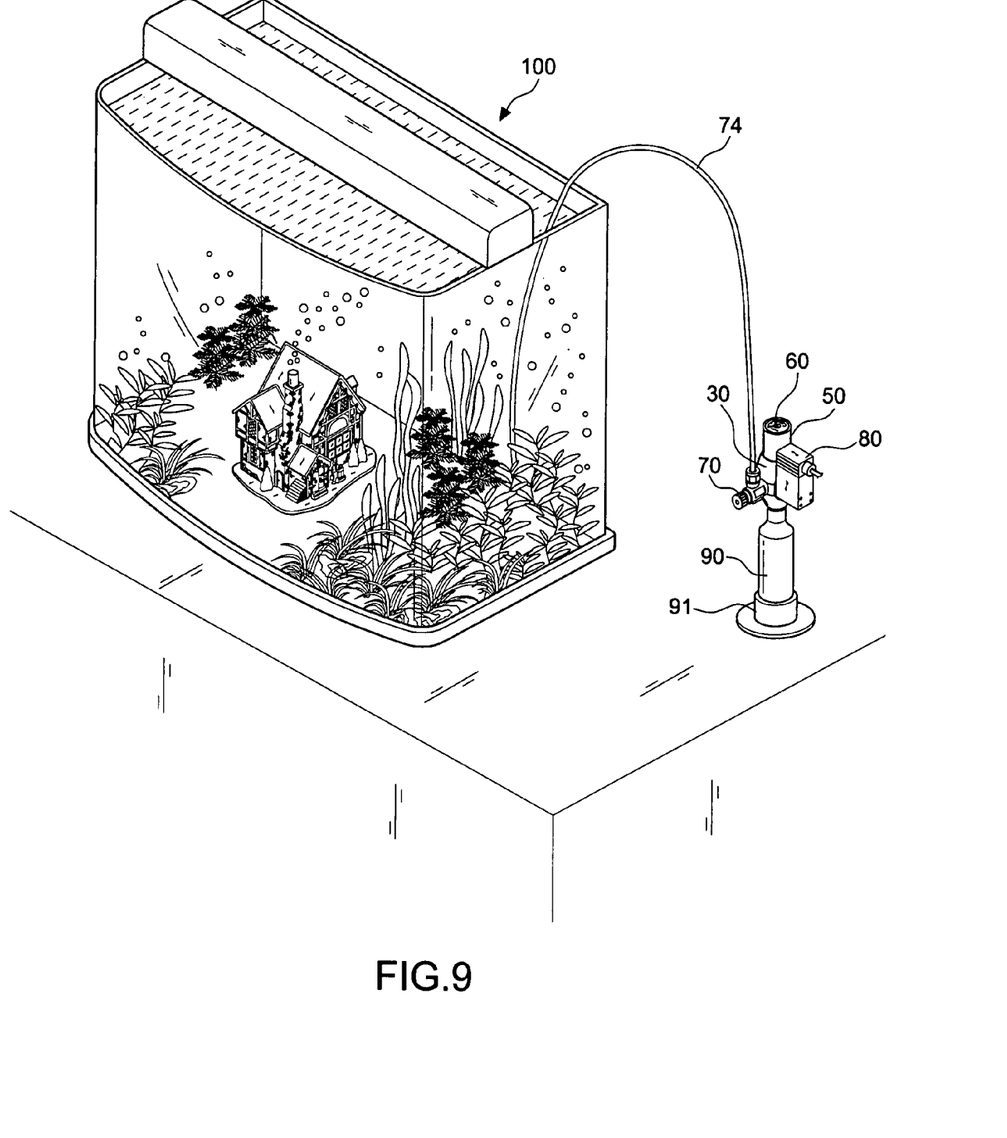
FIG. 9 is a perspective view of the application state of the invention.

In the embodiment according to FIG. 8, the escape channel 35 is not directly connected to the terminal gas outlet 38, but arrives at a cavity 36 first, leads to another escape channel 35' via the cavity 36, and finally to the terminal gas outlet 38. The structure is not restricted thereto. In other words, the escape channel 35 can be designed in such a manner that the escape channel 35 is directly connected to the terminal gas outlet 38. The adjusting knob 72 can be manually adjusted for controlling the gas output. A further arrangement of the invention lies in that a solenoid valve 80 is mounted at a side wall 37 of the main body 30 and includes a valve stem 81 for controlling the on/off status of the escape channel 35. The valve stem 81 is positioned in the cavity 36 at the rim of the escape channel 35. In this way, the solenoid valve 80 can be activated at a predetermined time for an automatic output of gas at a desired time. This design is particularly applicable to aquariums 100 for the use of breeding water plants (see FIG. 9). The mini-type high-pressure gas bottle 90 is placed on a base 91. The high-pressure gas bottle 90 is a disposable type and widely used. However, there is no applicable gas pressure regulator. To the contrary, the invention is particularly applicable to the high-pressure gas bottle 90. When the high-pressure gas bottle 90 runs out of gas, it just has to be replaced by a new gas bottle. It is very convenient. In addition, the main body 30 can be designed in a vertical manner. Meanwhile, the pressure detector 60 is integrally installed within the cylindrical body 50 such that it can be prevented from impact in use. Besides, an overall appearance is ensured, thereby occupying less space and enhancing the effectiveness of the product.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:
1. A one-piece gas pressure regulator, comprising:
  a) a main body having a first threaded port at the bottom thereof for a threaded connection with a high pressure gas bottle, an admission passage being formed above the first threaded port and extended to an hollow pressure chamber within the main body, the hollow pressure chamber having an escape channel for ejecting the gas via an output control element, wherein the main body includes a second threaded port having a greater diameter and is positioned above the hollow pressure chamber, the output control element being installed at a terminal gas outlet of the escape channel, the output control element including a threaded head for establishing a threaded connection to the terminal gas outlet, an adjusting knob at the rear end thereof, and a coupling head at the top thereof for connecting a gas-feeding hose; and b) a cylindrical body having an opening at the top and at the bottom thereof, the periphery of the lower member thereof being provided with thread for establishing a threaded connection to the second threaded port, the inside of the cylindrical body being divided by a partition into an upper and a lower chamber, the partition having a through hole in the middle thereof, the upper chamber being adapted to receive a pressure detector while the lower chamber is used to received a pressure adjusting element, the through hole being formed in such a way that a connecting head of a pressure detector is extended into the through hole;

whereby the main body and the cylindrical body are integrated into a body, and the upper portion of the cylindrical body and the pressure detector are formed in a one-piece pressure gauge while the lower portion thereof serves as an automatic gas-pressure balancing/regulating chamber for the lifting action of the pressure adjusting element;

wherein a solenoid valve is interposed between the escape channel and the output control element for controlling an on/off status of the escape channel, the solenoid valve being mounted at a side wall of the main body and includes a valve stem positioned in a cavity at a rim of the escape channel.

2. The one-piece gas pressure regulator as recited in claim 1 wherein the pressure detector includes a connecting head, a coiled telescopic tube attached to the connecting head, a disposed at the tail of the coiled telescopic tube, an instrument panel, and a transparent cap with which the opening of the upper chamber is covered.

3. The one-piece gas pressure regulator as recited in claim 1 wherein the pressure adjusting element in the lower chamber of the cylindrical body includes a piston, a tube attached to the bottom of the piston, a through hole formed at the side of the tube, and a spring mounted on the tube.

* * * * *